J. R. KIRLEY.
PISTON.
APPLICATION FILED JAN. 25, 1915.
1,210,378.
Patented Dec. 26, 1916.
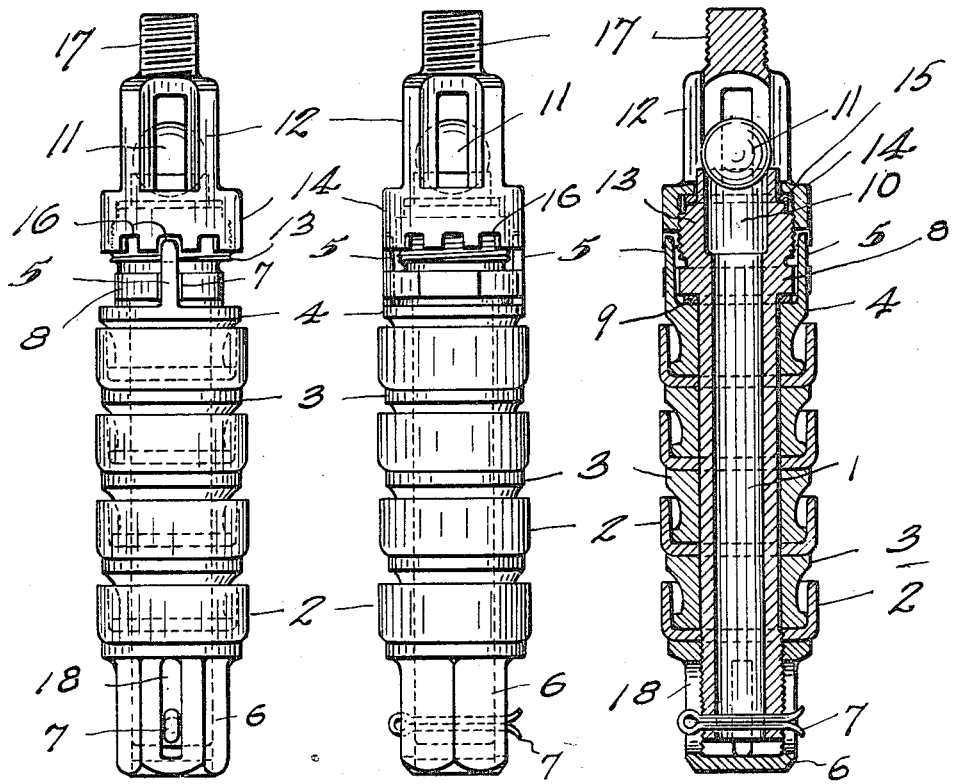
FIG.1  FIG.2  FIG.3
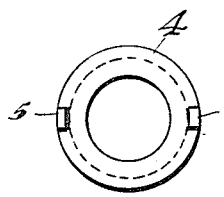  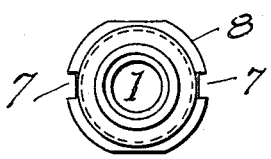
FIG.4  FIG.5
Inventor
JOHN R. KIRLEY
Witnesses
F. M. Glick
C. K. Davies
By Shigley & Harney
Attorneys

UNITED STATES PATENT OFFICE.

JOHN R. KIRLEY, OF NEW STRAITSVILLE, OHIO.

PISTON.

1,210,378.

Specification of Letters Patent. Patented Dec. 26, 1916.

Application filed January 25, 1915. Serial No. 4,258.

*To all whom it may concern:*

Be it known that I, JOHN R. KIRLEY, a citizen of the United States of America, residing at New Straitsville, in the county of Perry and State of Ohio, have invented certain new and useful Improvements in Pistons, of which the following is a specification.

The present invention relates to improvements in pistons, and especially that type used in connection with the pumping apparatus of an oil or Artesian well.

In the operation of the pumping apparatus in these wells, the piston is frequently lost from the suspending means or pump rod, and grab tools are required to recover the disconnected parts. Most frequently the piston portion becomes separated from the pump rod at the point where the piston and ball-cage are screwed together, and it is the purpose of my invention to eliminate this danger by providing a locking device to prevent the unscrewing of the threaded parts and thus avoid loss of time and labor that would otherwise eventuate in recovering a lost tool.

The invention consists essentially in certain novel features and combinations and arrangements of parts as will be hereinafter set forth in my specification and claims.

In the accompanying drawings I have illustrated one complete example of the physical embodiment of my invention constructed according to the best mode I have so far devised for the practical application of the principles of my invention.

Figure 1 is a side elevation of the valved piston embodying my novel means for locking the parts together. Fig. 2 is a side elevation as seen from right angles to Fig. 1. Fig. 3 is a vertical central sectional view of the device. Fig. 4 is a top plan view of the locking collar. Fig. 5 is a top plan view of the piston stem.

In the accompanying drawings I have illustrated a standard type of oil well valve equipped with my invention, in which the parts of the valved piston are built upon the piston stem 1 which is a hollow tube open at bottom and top, and upon which the cups 2 and collars 3 are arranged in alternation as usual.

The uppermost of the collars, however, as indicated at 4 is of special construction, in that it is formed with a pair of diametrically arranged projecting tongues 5, 5, rising from its upper surface. The usual retaining nut 6 is threaded on the lower end of the stem, and the cotter pin 7 holds the nut against displacement as clearly seen in Fig. 3.

The locking collar 4 is held in fixed relation to the piston stem 1 by means of the engagement of the tongues 5 5 in complementary notches 7 7 formed in the periphery of an angular flange or head 8 on the stem, and a gasket 9, metallic or otherwise, is located between the collar and flange.

At its upper end the piston stem is counterbored, to form the seat 10 for the ball 11, and the ball is inclosed and retained by the cage 12 as usual.

The stem is fashioned with an exteriorly threaded head 13 above the flange 8, and the nut portion 14 of the cage is threaded on the head, a gasket 15 being interposed between the head and nut, which serves not only to make a tight joint but also acts as a cushion between the parts. The lower edge of the cage or its nut portion is serrated or notched as at 16, and as clearly seen in Fig. 1 these notches are adapted to receive the ends of the pair of tongues 5 on the locking collar 4. The cage is of course attached to the pump rod through the threaded end 17, and it will be understood that as the piston stem reciprocates the fluid is forced or lifted from the slots 18 in the retaining nut, up through the hollow stem and past the ball valve.

In assembling the parts, the cage is first threaded on the top of the stem, and then the locking collar is passed over the lower end of the stem and moved up so that its tongues will engage the corresponding pair of notches in the flange of the stem and project into a pair of notches in the lower edge of the cage. The remaining collars and cups are then placed over the stem, and the retaining nut is finally threaded on the lower end of the stem and the cotter pin is inserted to hold the nut against turning. In this manner the parts of the valved piston are secured in place on the stem, and it will be apparent that there is no possibility of the cage and piston becoming disconnected, as the castellated or notched bottom rim or nut portion of the cage is prevented from turning by the locking collar, and the latter is prevented from turning through the medium of the notched flange on the stem.

From the above description taken in connection with my drawings it is evident that I have provided a device of this character that will perform its functions in a comparatively perfect manner, and which is at all times reliable and efficient.

What I claim is:—

1. In a device of the class described, a barrel, a crown forming a valve-cage screwed to the upper end of the barrel and provided with a lock notch, said barrel having a seat groove, a key mounted in said groove and engageable with said notch, and means from below for holding the key in engaged position with said notch.

2. The combination with a stem and a cage screwed thereon and formed with a castellated lower edge, of a collar slidable on the stem and having tongues engaging the castellated cage and the stem, whereby the cage and collar are locked against rotary movement on the stem.

3. The combination with a stem and a cage screwed thereon and formed with a castellated lower edge, a notched flange on the stem, and a collar on the stem having tongues in said flange and engaging the castellated edge of the cage.

4. In a device of the class described, a barrel, a crown forming a valve cage, screwed to the upper end of the barrel and provided with a lock notch, said barrel having a seat groove, a key mounted in said groove and engageable with said notch, cups and rings on said barrel and arranged with one of the cups bearing against the lower end of the key to hold the latter in locking position and a perforated bottom detachably secured to the barrel and holding the cups and rings.

5. In a device of the class described, a barrel, a crown forming a valve cage, screwed to the upper end of the barrel and provided with a lock notch, said barrel having a seat groove, a key mounted in said groove and engageable with said notch, cups and rings on said barrel and arranged with one of the cups bearing against the lower end of the key to hold the latter in locking position and a perforated bottom detachably secured to the barrel and holding the cups and rings, the said perforated bottom being screwed to the lower end of the barrel and a cotter pin locking the perforated bottom to the barrel.

6. In a device of the class described including a barrel, a crown screwed to the upper end of the barrel and provided with a lock notch, said barrel provided with a groove, a key slidably mounted in said groove and extending to a point below the end of the groove and the opposite end adapted to engage in said notch, means mounted on the barrel to engage the lower end of said key to hold it into an engagement with said notch, and means for holding said key engaging means in operative position upon the barrel.

7. In a device of the class described including a barrel, a crown screwed to the upper end of the barrel, and provided with a lock notch, said barrel provided with a groove, a key slidably mounted in said groove and extending to a point below the end of the groove and the opposite end adapted to engage in said notch, cups and rings mounted on said barrel to engage the lower end of said key to hold it into an engagement with said notch, and means for holding said cups and rings on the barrel into engagement with the key.

In testimony whereof I affix my signature in presence of two witnesses.

JOHN R. KIRLEY.

Witnesses:
E. S. MARTIN,
JNO. D. MARTIN.

Copies of this patent may be obtained for five cents each, by addressing the "Commissioner of Patents, Washington, D. C."